(12) United States Patent
Namm et al.

(10) Patent No.: US 7,711,319 B2
(45) Date of Patent: May 4, 2010

(54) METHOD AND SYSTEM FOR DISTRIBUTING TALK GROUP ACTIVITY AMONG MULTIPLE VEHICLE REPEATERS

(75) Inventors: Joseph C. Namm, Plantation, FL (US); Mark Antilla, Davie, FL (US); Clara Sanchez, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 625 days.

(21) Appl. No.: 11/679,894

(22) Filed: Feb. 28, 2007

(65) Prior Publication Data

US 2008/0207241 A1 Aug. 28, 2008

(51) Int. Cl.
 H04B 7/15 (2006.01)
 H04B 3/36 (2006.01)
 H04B 7/14 (2006.01)
 H04B 7/00 (2006.01)

(52) U.S. Cl. .......................... 455/11.1; 455/7; 455/518; 455/519

(58) Field of Classification Search .............. 455/414.1, 455/7, 11.1, 13.1, 518, 519, 67.11
See application file for complete search history.

(56) References Cited

U.S. PATENT DOCUMENTS

| | | | | |
|---|---|---|---|---|
| 5,235,631 | A * | 8/1993 | Grube et al. ................ | 455/509 |
| 5,239,666 | A * | 8/1993 | Truby ............................. | 455/9 |
| 5,511,232 | A * | 4/1996 | O'Dea et al. ................ | 455/519 |
| 5,857,144 | A * | 1/1999 | Mangum et al. ........... | 455/11.1 |
| 5,915,208 | A * | 6/1999 | Collyer ....................... | 455/11.1 |
| 6,169,880 | B1 * | 1/2001 | La Fratta et al. ........... | 455/11.1 |
| 6,493,537 | B1 * | 12/2002 | Ogawa .......................... | 455/9 |
| 6,647,244 | B1 * | 11/2003 | Haymond et al. .......... | 455/11.1 |
| 6,795,685 | B2 * | 9/2004 | Walkup ...................... | 455/11.1 |
| 7,035,657 | B2 * | 4/2006 | Chen et al. .................. | 455/518 |
| 2002/0111137 | A1 * | 8/2002 | Walkup ....................... | 455/22 |
| 2004/0223471 | A1 * | 11/2004 | Panchal et al. .............. | 370/335 |
| 2005/0070221 | A1 * | 3/2005 | Upton ........................ | 455/11.1 |
| 2007/0021138 | A1 * | 1/2007 | Allen et al. ................. | 455/518 |
| 2007/0270097 | A1 * | 11/2007 | Namm et al. .............. | 455/11.1 |
| 2008/0003942 | A1 * | 1/2008 | Namm et al. .............. | 455/11.1 |

OTHER PUBLICATIONS

Vehicular Tactical Network (V-TAC) 800 MHZ—2 Pages.

* cited by examiner

*Primary Examiner*—Nay A Maung
*Assistant Examiner*—Andrew Wendell
(74) *Attorney, Agent, or Firm*—Barbara R. Doutre (57) ABSTRACT

A system (100) and method (200) for providing a multiple channel site for supporting talk group activity is provided. The method includes determining (202) an arrival time (141) of a plurality of Vehicular Repeater System (VRS) (101-103) to a vicinity (140), identifying (204) talk group activity among the plurality of PSUs (171-176) in the vicinity, and assigning VRSs to talk groups in order of arrival time and talk group activity. A master VRS maintains and updates (322) a list of recently active talk groups (TG), orders (324) the list by frequency of use of a talk group, forwards the list to slave VRSs and PSUs, and allocates (326) single channels in view of the list to the slave VRSs. PSUs in the vicinity can read the assignment list and update their communication channel based on a selected talk group in the list.

20 Claims, 7 Drawing Sheets

| CHANNEL | TALK GROUP | FREQUENCY | VRS |
|---|---|---|---|
| 1 | A | 60% | 101 |
| 2 | B | 30% | 102 |
| 3 | C | 10% | 103 |

METHOD AND SYSTEM FOR DISTRIBUTING TALK GROUP ACTIVITY AMONG MULTIPLE VEHICLE REPEATERS

FIELD OF THE INVENTION

The present invention relates to radio communication systems and, more particularly, to configuring vehicular repeaters for supporting multiple talk group activity.

BACKGROUND

The use of portable electronic devices and mobile communication devices has increased dramatically in recent years. Mobile communication devices such as two-way radios can operate in various environments. As an example, Two-way radios can be mounted in vehicles for allowing communication between users over a wide area. Two-way radios can be deployed and mounted within police cars for providing dispatch or communication operations. In practice, the radios can be configured to operate over a radio communication channel. As one example, radios can be set to a single physical channel which allows voice and data communications to be sent to other radios that are tuned to the common channel.

Vehicle repeater systems (VRS) are currently used in radio communication systems to provide coverage to portable subscriber units (PSU) in areas where the coverage provided by the fixed system is insufficient. In one arrangement a VRS can be placed at a fixed location to extend coverage in a fixed area. In another arrangement, a VRS can be mounted within a vehicle that can be deployed to different regions. PSUs within proximity of the vehicle having the VRS can communicate amongst one another on a single channel provided by the VRS. The VRS typically consists of a mobile radio (MSU), generally operating on a fixed system, that is physically connected to a mobile repeater (VR). The MSU provides the radio communication to a fixed network equipment (FNE) on the fixed system, and the VR interfaces to the PSU on a conventional channel for providing talk groups. Multiple PSUs can use a single VRS for creating a talk group at any time if the PSUs are all on the same channel. However, the MR can only support one channel of communication at a time, and hence, only one talk group at a time. Accordingly, PSUs must be on the same channel to communicate with one another when operating on a VRS.

A single vehicular repeater system (VRS) can extend a coverage area of a fixed system, such as a trunked radio infrastructure. The VRS can provide one physical channel of communication to support one talk group at a time. The VRS can support data, image, or audio. Multiple VRSs can be deployed to a common site to provide support for multiple talk group activity. In prior art systems, one of the VRSs is designated as a master device, and the other VRSs are designated as slave devices to repeat radio communication for the master device. Because each VRS is only capable of providing one physical communication channel, the multiple VRSs, as configured together in the arrangement of the prior art, can only support one talk group at a time.

Because a VRS can only support one talk group at a time, a user of a PSU must wait for another user to release control of the channel. In such regard, the user must wait for talk group activity to cease before changing talk groups to acquire the single channel. In situations where multiple vehicles are deployed to a site with multiple talk groups, contention exists for the single channel. That is, since there is only one physical channel on a VRS only one of the talk groups can be useable at a time. A need therefore exists for providing support to multiple talk groups at a common site.

SUMMARY

Broadly stated, a system and method is provided for allowing multiple VRSs at a common site to operate together as a multiple channel site instead of a single channel site. One embodiment is a method for providing a multiple channel site using multiple VRS for supporting multiple talk groups. The method can include determining an arrival time of a plurality of Vehicular Repeater System (VRS) to a vicinity, identifying talk group activity among the plurality of PSUs in the vicinity, and assigning VRSs to talk groups in order of arrival time and talk group activity. The method can include assigning a first VRS in the vicinity as a master VRS, and assigning following VRSs that arrive in the vicinity as slave VRSs in order of arrival. The VRS can provide data and voice communication. The method can include maintaining a list of recently active talk groups (TG), sending the list to slave VRSs and PSUs, and allocating single channels in view of the list to the slave VRSs. A PSU can connect to a VRS in accordance with a talk group assignment identified in the list.

Another embodiment is a system for distributing multiple talk group activity. The system can include a fixed network equipment (FNE) that provides radio communication, and at least one Vehicular Repeater System (VRS) communicatively coupled to the FNE that extends coverage the radio communication to a plurality of portable subscriber units (PSU). A master VRS can identify talk group activity among the plurality of PSUs, assign slave VRSs to talk groups in order of talk group activity, and assign each slave VRS a communication channel for handling a single talk group. The master VRS and slave VRSs can be communicatively coupled in a vicinity via a radio frequency (RF) communication link. The VRS can include a mobile radio (MSU) having only one physical channel for providing a talk group with radio communication to the FNE, and a mobile repeater (VR) operatively coupled to the mobile radio and providing the one physical channel of communication to PSUs of the talk group Yet another embodiment is a method for distributing multiple talk group activity. The method can include identifying a first Vehicular Repeater System (VRS) that arrives in a vicinity and that communicates with a plurality of portable subscriber units (PSU), assigning the first VRS as a master VRS that provides a first channel for handling a first talk group in the plurality of PSU's, identifying a second VRS that arrives in the vicinity, identifying at least one PSU in the plurality of PSU's that changes to a second talk group, and assigning the second VRS as a slave VRS that provides a second channel for handling a second talk group for the at least one PSU. The method can include receiving talk group activity updates from slave VRSs over a RF communication link between multiple VRSs in the vicinity, determining a frequency of talk group use based on the talk group activity updates, and assigning channels and corresponding talk groups to slave VRSs in order of the frequency of talk group use, wherein each slave VRS provides only one single physical channel at a time for handling a talk group.

BRIEF DESCRIPTION OF THE DRAWINGS

The features of the system, which are believed to be novel, are set forth with particularity in the appended claims. The embodiments herein, can be understood by reference to the following description, taken in conjunction with the accompanying drawings, in the several figures of which like reference numerals identify like elements, and in which:

DETAILED DESCRIPTION

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "processing" can be defined as number of suitable processors, controllers, units, or the like that carry out a pre-programmed or programmed set of instructions.

Briefly, radios can support communication over various frequencies, or channels. The radios can also scan for activity on those channels, for example, those channels for which the radio is configured to communicate. The radio can include a configuration which identifies communication functions available to the radio. As one example, the configuration can include a radio operating frequency and private line information. The radios can allow inbound communication on a channel associated with the frequency and private line. For example, a plurality of radios can be designated with the same private line and distributed to a team. Members of the team can communicate with one another since the radios are on the same private line. As an example, the private line may be a channel number, such as 1-24, that can be physically set on the radio. In the field, the radio can scan for activity on a frequency specified by the radio configuration.

Figure 1:
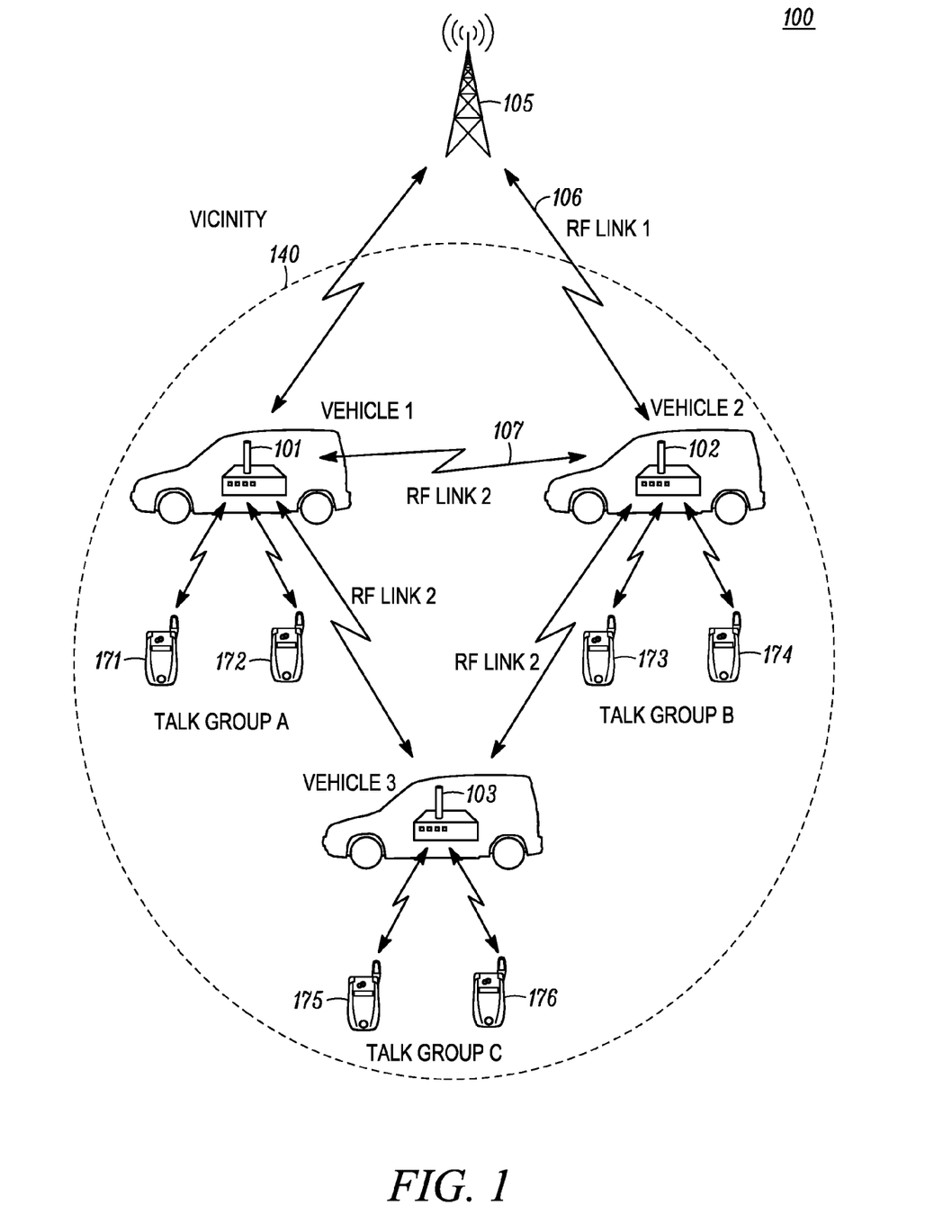
FIG. 1 is a mobile communication system that supports multiple talk group activity in accordance with the embodiments of the invention.

Referring to FIG. 1, a mobile communication environment 100 for providing radio communication is shown. The mobile communication environment 100 can include a fixed network equipment component, such as base station 105, communicatively coupled over a first radio frequency (RF) link 106 to one or more vehicular repeater systems (VRS), such as VRS 101, VRS 102 and VRS 103. The VRSs (101-103) can also communicate amongst one another over a second RF link 107. The VRSs (101-103) extend a coverage area of the base station 105 to one or more personal subscriber units (PSUs) 171-176. A PSU (171-176) can be a hand-held radio, a vehicle mounted radio, a dispatch radio, or a mounted communication system. The base station 105 can provide radio communication through the first RF link 106 to the one or more VRSs (101-103) which allows the PSUs (171-176) to communicate amongst one another in talk groups over the first RF link 106.

As an example, as shown, VRS 101 is mounted in a first vehicle and provides radio communication to PSU 171 and PSU 172 in a Talk Group A. VRS 102 is mounted in a second vehicle and provides radio communication to PSU 173 and PSU 174 in a Talk Group B. Similarly, VRS 103 is mounted in a third vehicle and provides radio communication to PSU 175 and PSU 176 in a Talk Group C. Notably, more or less than the number of PSUs (171-176) can be included in each talk group, and more or less than the number of vehicles or VRSs (101-103) can be included for providing talk group support.

The PSUs 171-176 can be hand-held mobile devices that allow a user to move freely within a vicinity 140 of the extended coverage area provided by the corresponding VRSs (101-103). The vicinity 140 is a region in which the VRS can successfully transmit and receive radio communication signals from a PSU. For example, the signal strength in the vicinity 140 is sufficient for radio communication. The PSUs 171-176 can communicate with one another, and with other radios such as hand-held portable walkie talkies within the vicinity 140. A VRS can provide talk group support to a plurality of PSUs in an area of the VRS. Voice and data communication between PSUs spanning two or more VRSs over wider areas in the vicinity 140 can be provided over the first RF link 106. More than one PSU is generally present in a talk group for supporting group call or dispatch communication. In one arrangement, the PSUs 171-176 may be mounted in a vehicle such as a police car, an ambulance, a fire truck, or the like. The vehicles allow the users broader mobility and portability to different areas.

In one aspect, the PSUs 171-176 can communicate in a talk group with one another over the radio frequency communication link 106. As is known in the art, the PSUs 171-176 can each include a transmitter and a receiver for providing wireless communication over the RF link 106. The PSUs 171-176 can communicate with a corresponding VRS over one or more channels within a frequency band of the RF link 106 but using only one band at a time. For example, PSUs 171-172 in coverage area of VRS 101 can use a first channel for Talk Group A. PSUs 173-174 in coverage area of VRS 101 can use a second channel for Talk Group B. In radio terminology, a channel can be defined as a specific radio frequency, or band of frequencies, usually described in conjunction with a predetermined letter, number, or codeword. For example, a radio frequency spectrum can be divided into a plurality of frequency bands such as UHF and VHF. As is known in the art, Very high frequency (VHF) is the radio frequency range from 30 MHz to 300 MHz. In contrast, Ultra high frequency (UHF) designates a range (band) of electromagnetic waves whose frequency is between 300 MHz and 3.0 GHz. UHF frequencies' propagation characteristics are ideal for short-distance terrestrial communication such as radio communication. As one example, the UHF band can support the Family Radio Service (FRS) which is an improved two-way system or Public Safety Radio Services for providing emergency communication. As one example, within Public Safety Radio, the base station 105 can support 25 KHz bandwidth channels within a 700-800 MHz carrier frequency range. Embodiments of the invention are not however limited to the radio frequency bands and can include frequency bands associated with other TDMA systems.

The mobile communication system 100 is configured to provide multiple talk group radio communication support over a plurality of VRSs (101-103) that are only capable of providing one channel of communication at a time. The mobile communication system 100 allows the VRSs (101-103) on site in the vicinity 140 to operate as a multiple site configuration instead of a single channel site. Briefly, the VRSs (101-103) are each configured to handle a single channel for a talk group based on an arrival time of a VRS to the vicinity 140 and a frequency of use of the talk group. Each VRS is assigned a communication channel to provide support for a talk group based on talk group activity.

Figure 2:
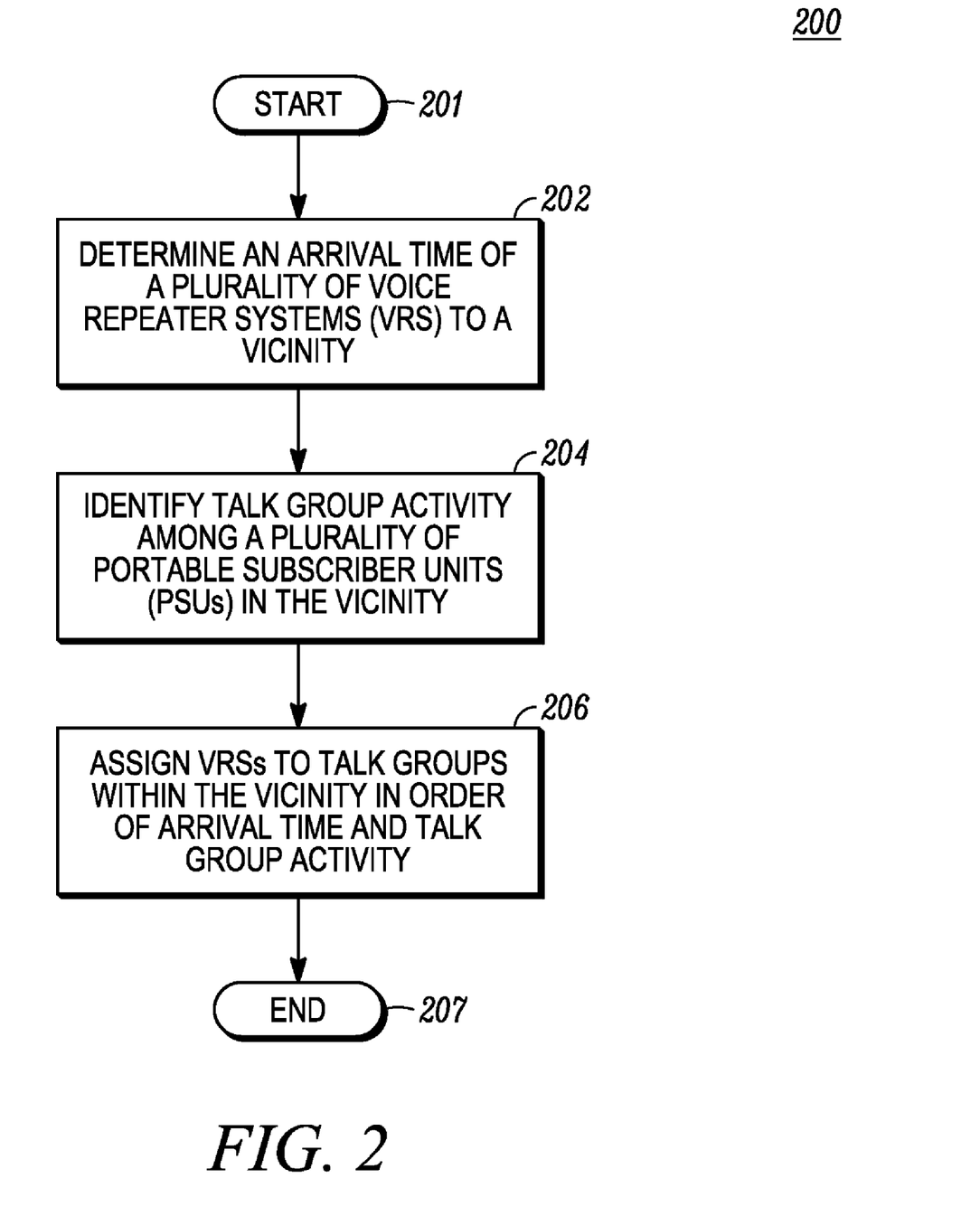
FIG. 2 is a method for providing a multiple channel site for talk group activity in accordance with the embodiments of the invention.

Referring to FIG. 2 a method 200 for providing a multiple channel site using a plurality of VRSs to support multiple talk group activity is shown. The method 200 can be practiced with more or less than the number of steps shown. To describe the method 200, reference will be made to FIG. 1 and 3. The method 200 can contain a greater or a fewer number of steps than those shown in FIG. 2

At step 201, the method 200 can start. At step 202 an arrival time of a plurality of Vehicular Repeater System (VRS) to a vicinity can be determined. The arrival time identifies when a VRS is available in the vicinity 140 for providing talk group support. The arrival time determines the precedence for which VRSs are assigned communication channels. Each communication channel assigned to a VRS provides support for one talk group that can include multiple PSUs as shown in FIG. 1

Figure 3:
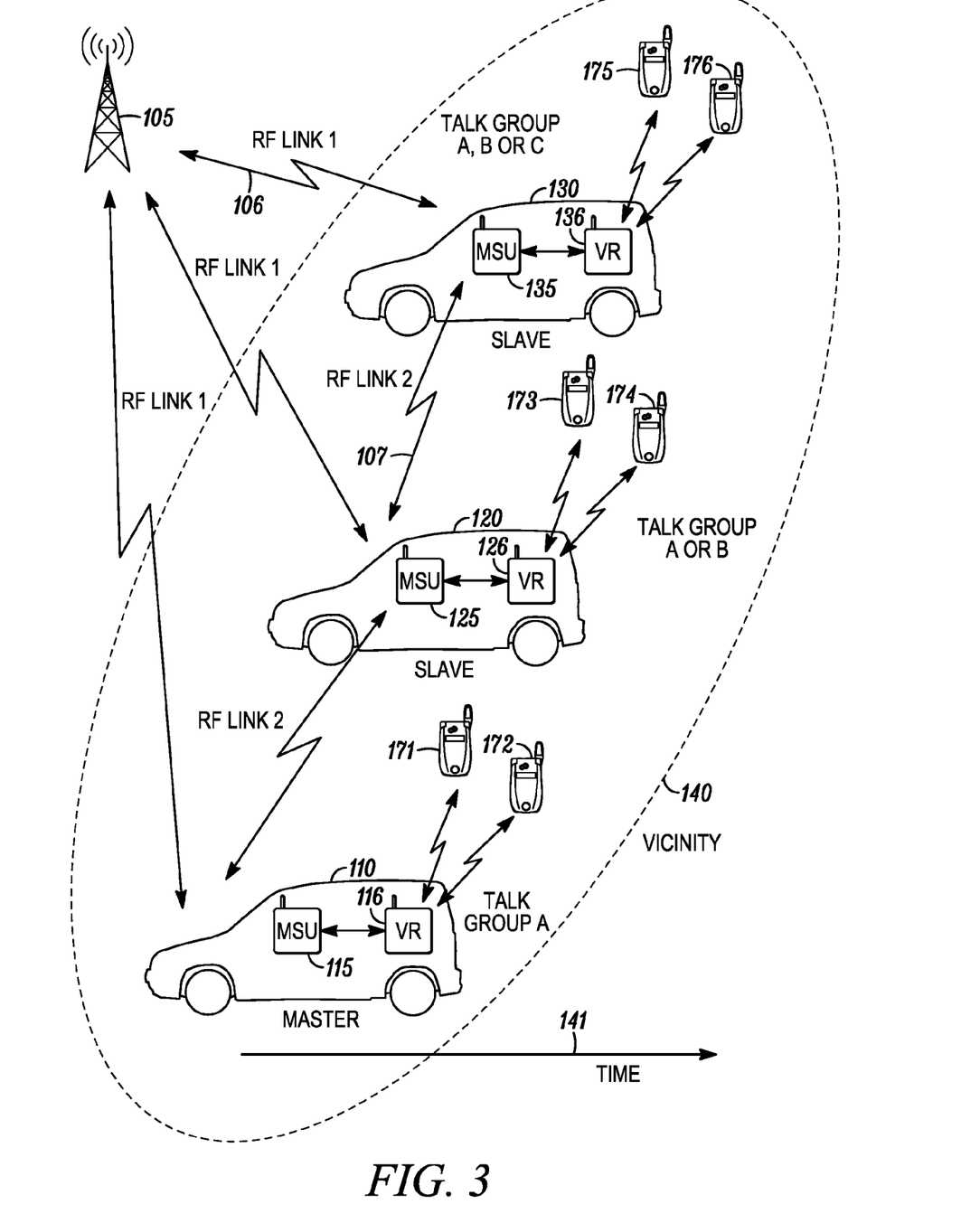
FIG. 3 is depiction of assigning vehicular repeater systems in accordance of arrival time to a vicinity in accordance with the embodiments of the invention.

For example, referring to FIG. 3, VRS 101 may arrive first in the vicinity, followed by VRS 102, then followed by VRS 103. As shown, the plurality of VRSs (101-103) each provide radio communication to a corresponding plurality of portable subscriber units (PSU). Each VRS can include a mobile radio and a mobile repeater. For example, VRS 101 can include a mobile radio (MSU) 115 having radio communication with the base station 105 over the RF link 106, and a mobile repeater (VR) 116 operatively coupled to the mobile radio 115 and providing only one physical channel of communication to PSUs (171-172) in the Talk Group A. Similarly, VRS 102 can include a mobile radio (MSU) 125 and mobile repeater (VR) 126 for providing one physical channel of communication to PSUs (173-174) in Talk Group B. Similarly, VRS 103 can include a mobile radio (MSU) 135 and mobile repeater (VR) 136 for providing one physical channel of communication to PSUs (175-176) in Talk Group C.

Notably, each VRS provides only one physical channel of communication to a talk group at a time. It should also be noted that any of the PSUs can move to a coverage area of another VRS (101-103) in the vicinity and still receive radio communication support. That is, the VRSs (101-103) together can provide talk group support to all the PSUs in the vicinity 140 regardless of a PSU's location. In particular, each PSU keeps track of VRS communication channels and corresponding talk groups. A PSU can identify which VRS provides radio communication for a specific talk group, and connect to the VRS in response to a user action such as changing to another talk group. The VRSs (101-102) can exchange talk group activity information for assigning communication channels over RF link 1 to support multiple talk groups. The VRSs (101-102) can communicate with one another over RF link 2 (107) to assess talk group activity among the plurality of PSUs (171-176)

Figure 4:
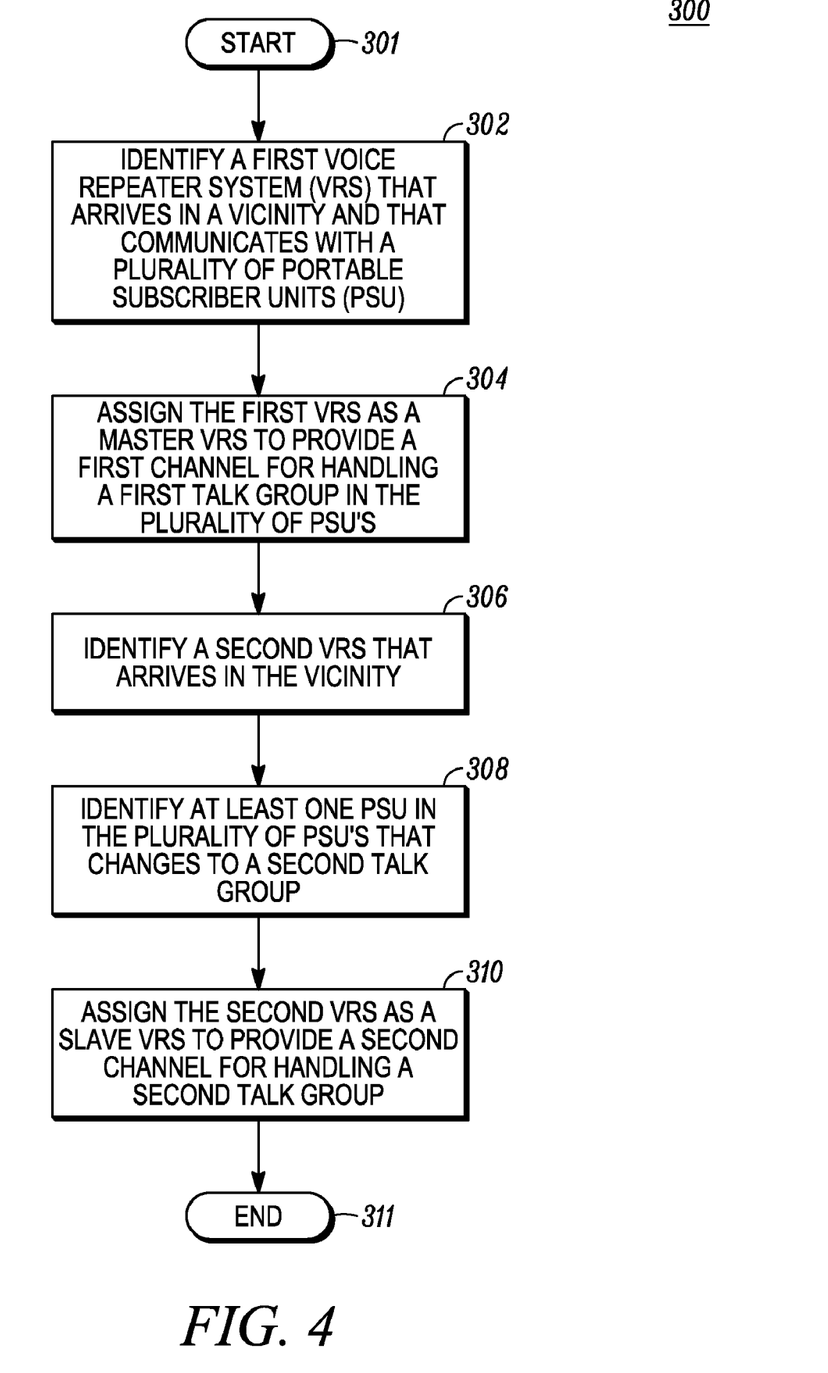
FIG. 4 is a method distributing multiple talk group activity in accordance with the embodiments of the invention.

At step 204, talk group activity among the plurality of PSUs can be identified. Talk group activity describes how active the users are in conversation or dialogue. Talk group activity can be based on voice activity, data activity, or channel activity. As an example, talk group activity can be measured by the number of PSUs on a given channel, by the duration of voice or data communicated on a channel, or by the quantity of voice or data communicated on a channel. In practice, a first VRS to arrive in the vicinity 140 can be designated as a master VRS. The master VRS can receive talk group activity updates from the other VRSs to assess talk group activity in the vicinity 140. The master VRS can assign slave VRSs to each support a talk group At step 206, VRSs can be assigned to talk groups within the vicinity in order of arrival time and a frequency of use of a talk group. The frequency of use of a talk group describes how often a communication channel is used to support voice activity. For example, referring to FIG. 3, VRS 101 may log N dispatch calls per hour in the vicinity 140, whereas VRS 102 may log N+M log calls per hour, where N and M are positive integers. Briefly, the master device can maintain a list of recently active talk groups (TG), send the list to slave VRSs and PSUs, and allocate single channels in view of the list to the slave VRSs. A PSU upon receiving the list, can connect to a VRS in accordance with a talk group assignment identified in the list Referring to FIG. 4 a method 300 for distributing multiple talk group activity among a plurality of VRSs is shown. Reference will be made to FIGS. 1 and 3 for describing the method. The method 300 can include more or less than the number of steps shown. The method 300 can begin in a state wherein multiple vehicles each containing a vehicular repeater system (VRS) are deployed to a vicinity. The vehicles can arrive at staggered times 141 as shown in FIG. 3

At step 302, a first Vehicular Repeater System (VRS) that arrives in the vicinity at a first time 141 and that communicates with a plurality of portable subscriber units (PSU) can be identified. For example, referring to FIG. 3, Vehicle 1 containing VRS 101 can be the first to arrive in the vicinity 140. The base station 105 can determine that VRS is the first in the vicinity 140 based on location data, time, or information provided by the VRS 101. At step 304, the first VRS 110 can be assigned as a master VRS to provide a first channel for handling a first talk group in the plurality of PSU's. As shown in FIG. 3, PSUs 171 and 172 comprise the first talk group (Talk Group A). If only the master VRS 101 is on site, then only one channel is provided at a time. Consequently, a user desiring to change talk groups must wait for the channel to be released At step 306, a second VRS that arrives at a second time 141 in the vicinity can be identified. The second VRS can provide a second channel to support a second talk group if needed. For example, referring to FIG. 3, the second VRS 102 to arrive in the vicinity can first act as a repeater to include PSUs 172 and 173 in Talk Group A. Accordingly, a second talk group is not needed, since all the PSUs join Talk Group A. Alternatively, VRS 102 can establish a second talk channel to provide talk group B if any of the PSUs (171-174) in the vicinity 140 at the time 141 switch to another talk group. For example, at step 308, at least one PSU in the plurality of PSU's can be identified that changes to a second talk group. Notably, the VRS that provides radio communication to the at least one PSU can determine when the PSU changes talk groups. For instance, the user of the PSU may change from a first private line to a second private line. The VRS can determine that the PSU has changed channels At step 310, the second VRS 102 can be assigned as a slave VRS to provide a second channel for handling a second talk group for the at least one PSU. For instance, referring to FIG. 3, if PSUs 173 and 174 decide to create their own Talk Group B by switching to a private line, the master VRS 101 can assign VRS 102 to change communication channels to support talk group B. In such regard, VRS 102 will be assigned a transmit and receive frequency that is different from a transmit and receive frequency of the master VRS 101. Accordingly, VRS 101 can provide radio communication for Talk Group A, and VRS 102 can provide radio communication for Talk Group B. Notably, PSUs (171-174) within either Talk Group A or Talk Group B can switch between talk groups. Also, a PSU may enter the coverage area of another VRS and switch to radio communication support under that VRS. The VRSs 101 and 102 are also not limited to providing only one designated talk group. For example, VRS 101 can support talk group B and VRS 102 can support talk group A.

The method 300 can further comprise identifying at least one more VRS that arrives in the vicinity, identifying at least one more PSU in the plurality of PSU's that changes to at least one more talk group, and assigning the at least one more VRS as a slave VRS that provides at least one more channel for handling the at least one more talk group. For example, referring to FIG. 3, VRS 103 can be the third VRS to arrive in the vicinity 140. The master VRS 101 can assign VRS 103 a separate communication channel having a separate transmit and receive frequency if any of the PSUs switch to a talk group other than Talk Group A or Talk Group B. For example, PSUs 174 and 176 can create Talk Group C and receive radio communication support through VRS 103. Notably, the VRSs (101-103) can communicate amongst one another to determine talk group activity and assign communication channels over the RF link 150.

Figure 5:
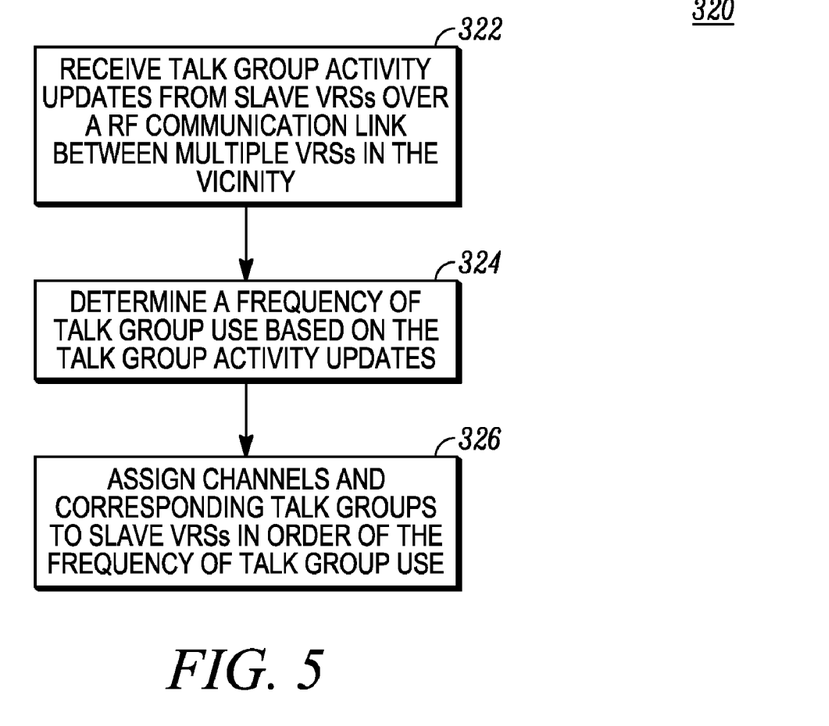
FIG. 5 is a method for assigning channels based on talk group activity in accordance with the embodiments of the invention.

Referring to FIG. 5, the master VRS 101 receives talk group activity updates from slave VRSs (102-103) over RF communication link 2 (107) as shown in step 322. Talk group activity updates identify a frequency of use of a channel. It should be noted that a frequency of use is how often the channel is used, and not the physical communication frequency (Hz) of the channel. At step 324, the master VRS can determine a frequency of talk group use based on the talk group activity updates. At step 326, the master VRS assigns channels and corresponding talk groups to slave VRSs (102-103) in order of the frequency of talk group use. The master VRS 101 creates and maintains a list of recently active talk groups (TG), sends the list to slave VRSs and PSUs, and allocates single channels in view of the list to the slave VRSs to provide multiple talk group activity to the PSUs.

Figure 6:
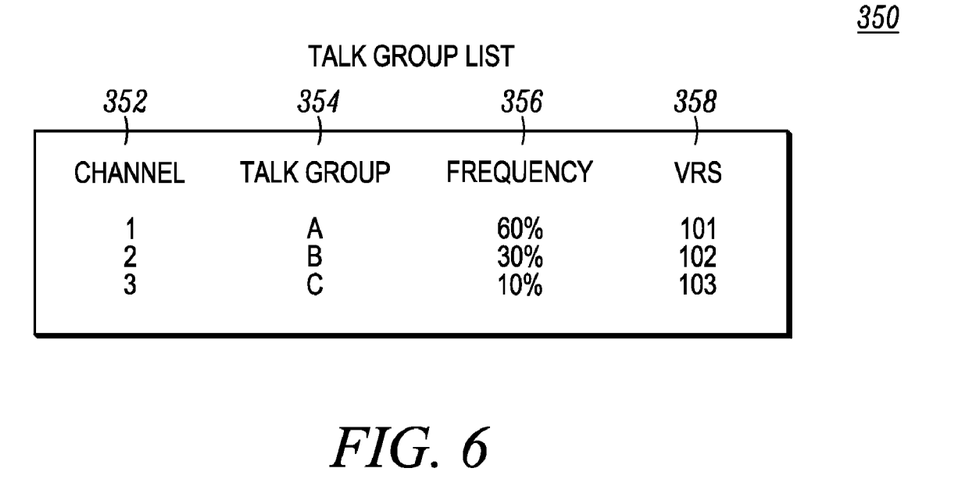
FIG. 6 is an exemplary assignment list in accordance with the embodiments of the invention.

The master VRS 101 can store talk group activity information in the list 350 shown in FIG. 6. The list 350 can include a channel entry 352 that identifies a channel of a VRS, a talk group entry 354 that identifies a talk group that the VRS is supporting, a frequency of use entry 356 that identifies talk group activity in the talk group 354 on the channel 352, and a VRS entry 358 that identifies the VRS assigned to the channel. The list 350 can contain more or less entries than shown.

Referring back to FIG. 3, the master VRS 101 can share the list 350 with the slave VRSs (102-103). The master VRS 101 reads the list 350 to determine the frequency of use of the corresponding talk channel and to assign slave VRSs in accordance with an arrival time in the vicinity. Each slave VRS can read the list 350 and determine which channel 352 to use to support an assigned talk group 354. Each slave VRS can forward the list 350 to PSUs, which can then connect to an appropriate VRS based on channel and talk group assignments. The master VRS 101 also keeps track of VRSs that leave or enter the vicinity 140 and updates the list in accordance with VRS in the vicinity. The master VRS 101 also assigns channels to the VRSs based on talk activity identified by the frequency entry 356. In one aspect, the master VRS handles a first talk group with a highest talk group activity, and assigns slave VRSs to handle talk groups in order of talk group activity based on the VRS's arrival time.

By maintaining a list of recently active Talk Groups (TG), the Master VRS 101 can allocate channels to the slave VRSs (102-103) for supporting multiple talk group activity. The most frequently used (356) Talk Group occupies the top of the list 350, followed by the next most frequently used, and so on. The master VRS 101 can assign a TG to each slave VRS (102-103) starting with the second most active TG. The most active TG is handled by the master VRS 101. The TG assignment consists of a TG and a channel with a corresponding transmit and receive frequency. The master VRS 101 updates the list 350 over time and sends it to all of the slave VRSs (102-103) operating in the vicinity 140 via the RF link 2 (107). The master VRS 101 can repeat talk group traffic for the most frequently used talk group at the top of the list.

The master VRS 101 assigns subsequent talk groups in the list to the slave VRSs (102-103) in the order in which they arrive on scene in the vicinity 140. For example, referring back to FIG. 3, the master VRS 101 assigns the second most frequently used talk group (Talk Group B) in the list 350 to the first slave VRS 102 to arrive on scene. The master VRS 101 assigns the next most frequently used talk group (Talk Group C) to the second slave 103 to arrive on scene, and so on. The slave VRSs (102-103) will provide the master VRS 101 with their most recent talk group activity so the master can properly maintain the list 350. Alternatively, the master VRS 101 assigns slave devices in order of communicative recognition to the master VRS; that is, when they are recognized by the master VRS 101

Figure 7:
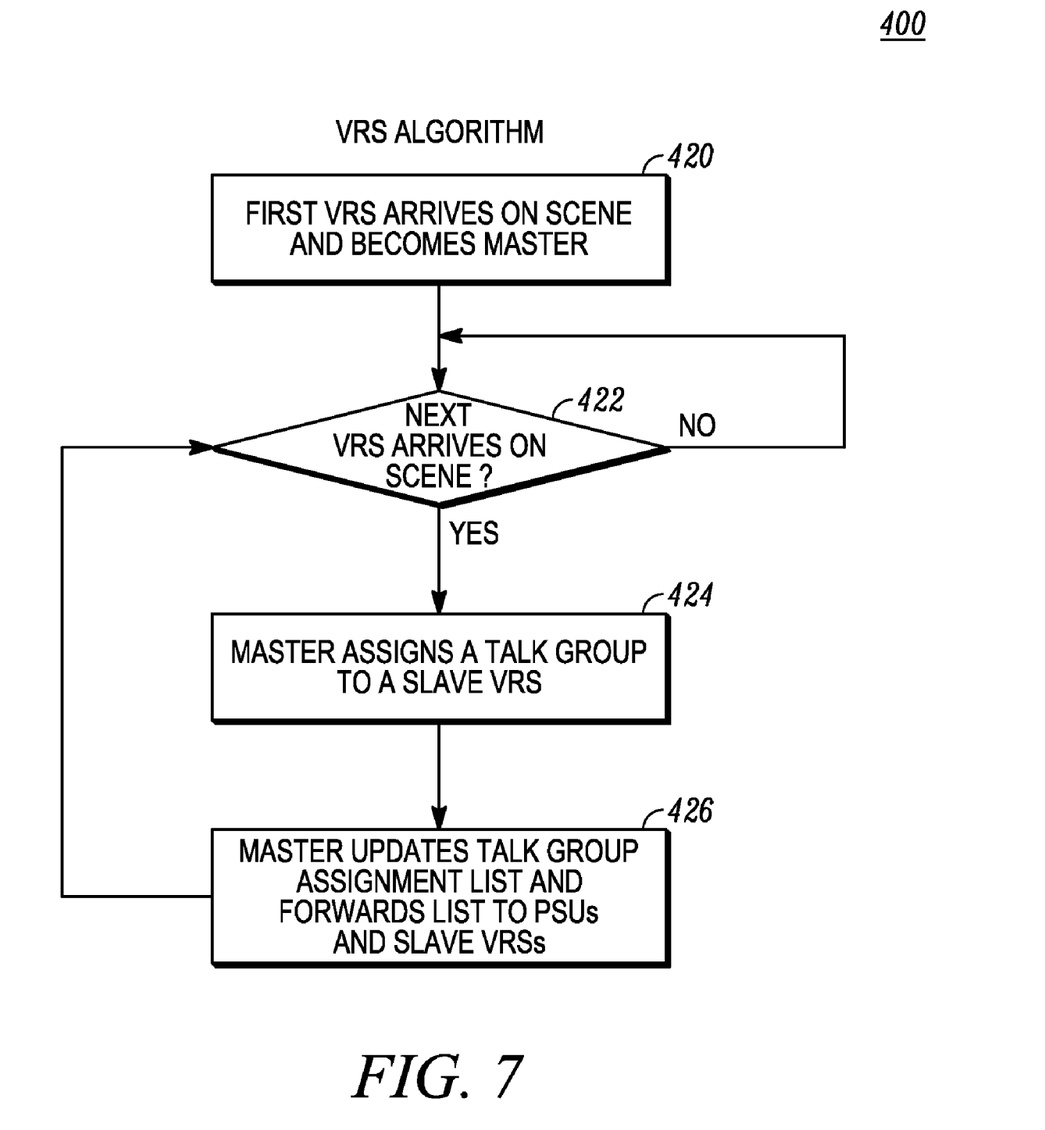
FIG. 7 is a flowchart for a vehicular repeater system (VRS) algorithm to support multiple talk groups in accordance with the embodiments of the invention.

Referring to 7, a flowchart 400 for an exemplary vehicular repeater system (VRS) algorithm is shown. The flowchart 400 can be practiced with more or less than the number of steps shown. Reference will be made to FIG. 3, when describing the flowchart 400. Briefly, the flowchart 400 illustrates one implementation for practicing the method 300 of FIG. 4. The flowchart 400 is implemented by a VRS within the mobile communication system 100 of FIG.

At step 402, a first VRS arrives on the scene and becomes the master VRS. With one VRS on the scene, all PSUs 171-176 communicate with the master VSR. For example, referring back to FIG. 3, Vehicle 1 containing VRS 101 is the first to arrive on the scene and provides one channel of communication for supporting a single talk group for all PSUs 171-172. The mobile radio 116 of VRS 101 provides one physical channel for supporting a single talk group since only the master VRS is in the vicinity. At step 404, the master VRS 101 can determine if any other VRSs arrive in the vicinity 140. If no more VRSs arrive in the vicinity, the master VRS 101 provides radio communication support for one talk group. If more VRSs arrive in the vicinity 140, the master VRS 101 assigns the VRSs as slave devices as needed for supporting more than one talk group at step 424. The master VRS 101 can assign new talk group (TG) assignments for talk groups that are not currently assigned to a VRS. Activity on a TG that is not currently assigned will use the new TG assignment For example, referring back to FIG. 3, the master VRS 101 assigns the second VRS 102 arriving in the vicinity to support an additional talk group if no other VRS is supporting the talk group. For instance, if all PSUs 171-176 are on the same talk group A then VRS 102 simply performs as a repeater for talk group A. If, for example, PSU 171 changes from talk group A to talk group B, then master VRS 101 assigns the second VRS 102 to arrive on the scene to support Talk Group B. In this case, VRS 102 switches from performing as a repeater for Talk Group A to supporting Talk Group B. Over time, the PSUs 171-172 may change to one or more talk groups, and accordingly, master VRS 101 updates talk group assignments based on currently active talk groups. In such regard, the master VRS 101, by assigning channels to VRSs based on current talk group activity, dynamically supports multiple talk groups at the same time. Also, VRSs may enter or leave the vicinity thereby altering the dynamics of the multiple talk group site. Both aspects can be considered talk group activity At step 426, the master VRS updates the talk group assignment list 350 based on talk group activity and forwards the list 350 to PSUs 171-176 and slave VRS. The master VRS 101 sends the update list 350 via RF link 2 (107) to the slave VRSs. The slave VRSs then transfer the list to the PSU currently assigned on the slave VRS's repeater channels. In such regard, each VRS is provided with a talk group list 350 that identifies which channel each slave VRS is responsible for supporting. In one arrangement, the VRS can hand over a PSU from one talk channel to another talk channel. In another arrangement, the PSU can identify a VRS supporting a TG from the received list 350 and change to the VRS. In such regard, the PSU reads the list 350 and determines which slave VRS to connect with to join a TG. The master VRS 101 can continue to update the list 350 as slave VRSs enter or leave the vicinity. If the master VRS 101 leaves the vicinity, the slave device supporting the most active talk group then becomes the master VRS 101.

Figure 8:
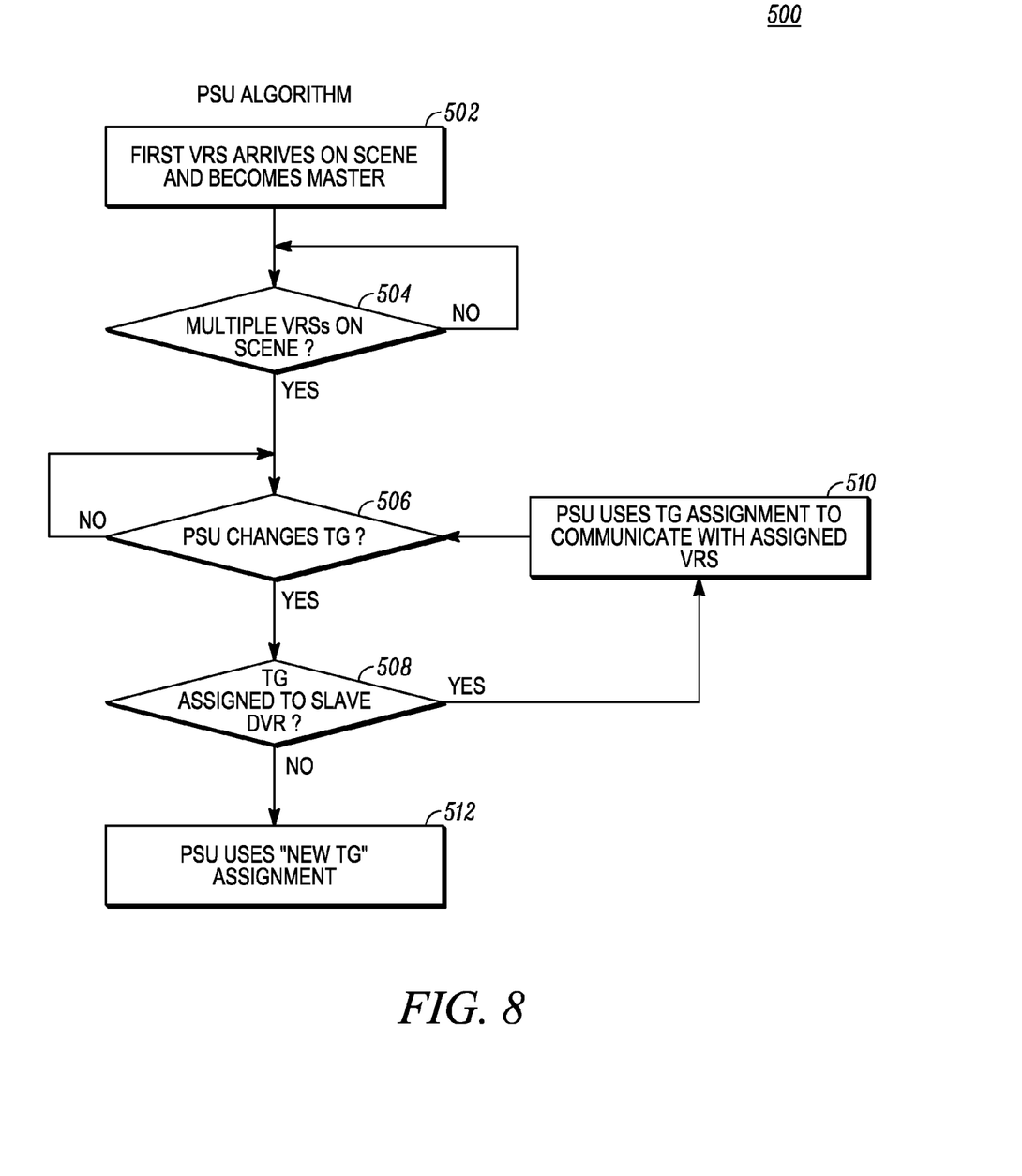
FIG. 8 is a flowchart for a personal subscriber unit (PSU) algorithm in accordance with the embodiments of the invention.

Referring to 8, a flowchart 500 for an exemplary personal subscriber unit (PSU) algorithm is shown. The flowchart 500 can be practiced with more or less than the number of steps shown. Reference will be made to FIG. 3, when describing the flowchart 500. Briefly, the flowchart 500 illustrates one implementation for practicing the method 300 of FIG. 4. The flowchart 500 is implemented by a PSU within the mobile communication system 100 of FIG.

At step 502, a first VRS arrives on the scene and becomes master VRS. With only one VRS in the vicinity 140, all PSUs 171-176 communicate with the master VRS. At step 504, the master VRS can determine if multiple VRS arrive in the vicinity 140. If multiple VRSs arrive on the scene and all of the PSUs 171-176 are on the same talk group A, then the master VRS 101 assigns all VRSs as slave devices to repeat radio communication on Talk Group A.

At step 506, the master VRS 101 can determine if a PSU changes to another talk group. For example, referring to FIG. 3, PSU 173 may be in Talk Group A and change to Talk Group B. The slave VRS 102 assigned to PSU 173 can inform master VRS 101 that PSU 173 has changed talk groups. The master VRS 101 can update the list 350 based on the talk group activity provided by VRS 102.

At step 508, the master VRS 101 can assign VRS 102 as a slave device to support radio communication on Talk Group B in view of the list 340. It should also be noted that the master device 101 assigns slave VRSs in order of arrival time. For example, in FIG. 3, VRS 102 is the second VRS to arrive in the vicinity, and is therefore the first slave VRS to receive a talk group assignment. The master VRS 101 can forward the list 350 to VRS 101 and VRS 102, which can then forward the list to PSUs 171-176.

At step 510, PSUs use the TG assignment in the list 350 to communicate with assigned VRS. In the presented example, PSU 173 will remain with VRS 102, since the master VRS 101 assigned VRS 102 to Talk Group B. In contrast, PSU 174 will have to connect with master VRS 101 to stay connected on Talk Group A. Notably, each PSU updates their communication channel based on the currently selected TG in the list 350. That is, if a slave VRS is reassigned talk groups, then each PSU under the slave VRS must identify which slave VRS to connect based on the update channel and talk group assignments in the list 350. The master VRS 101 continues to monitor talk group activity among the PSUs (171-176) across talk groups, update the list 350, and forward to slave VRSs. The master VRS 101 forwards the list to all slave VRS each time a PSU changes talk group. This allows each PSU (171-176) to identify each VRS by talk group In summary of method 500, each PSU will initially register with the master VRS. During registration the PSU will receive the list 350 associating TGs with VRS channels (frequency pairs). When a user of a PSU selects a TG to operate on, the PSU will change its conventional Rx/Tx channel to the corresponding VRS channel identified in the assigned list 350. That VRS will link the PSU(s) operating on that specific TG to the fixed system. As the list 350 is updated each PSU will receive the updated list from the VRS that is currently associated to the selected TG. The master VRS updates TG assignments for slave VRSs based on current TG activity, or usage. Assignments start with highest priority going to the master VRS. Each subsequent priority TG is assigned to each available slave VRS until there are no more TGs to assign, or until each slave VRS has a TG assigned. A "New TG" assignment will be maintained with one of the slaves in order to provide a channel for the next TG. The channel is either previously unused and/or not currently in the list. The new TG channel assignment is used when a PSU selects a TG that is not currently assigned to a VRS.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A method for providing a multiple channel site for multiple talk groups, the method comprising:
   determining an arrival time of a plurality of Vehicular Repeater System (VRS) to a vicinity, wherein the plurality of VRSs provide communication to a plurality of portable subscriber units (PSU);

identifying talk group activity among the plurality of PSUs in the vicinity; and assigning VRSs to talk groups in order of arrival time and talk group activity.

2. The method of claim 1, further comprising assigning a first VRS in the vicinity as a master VRS, and assigning following VRSs that arrive in the vicinity as slave VRSs in order of arrival.

3. The method of claim 2, further comprising:

assigning a single communication channel to each VRS based on a frequency of talk group use, wherein the master VRS handles a first talk group with a highest talk group activity, and the master VRS assigns slave VRSs to handle talk groups in order of talk group activity based on the slave VRSs arrival time.

4. The method of claim 1, further comprising maintaining a list of recently active talk groups (TG), sending the list to slave VRSs and PSUs, and allocating single channels in view of the list to the slave VRSs.

5. The method of claim 4, further comprising, at a PSU, connecting to a VRS in accordance with a talk group assignment identified in the list.

6. The method of claim 4, further comprising determining when a PSU changes talk groups, identifying a VRS to handle the PSU in view of the list, and providing a transmit and frequency pair channel for the PSU to use with the VRS.

7. The method of claim 4, further comprising determining when a PSU changes to a new talk group, and assigning a new VRS to handle the new talk group.

8. A system for distributing multiple talk group activity, the system comprising:

a fixed network equipment (FNE) that provides radio communication; and at least one Vehicular Repeater System (VRS) communicatively coupled to the FNE that extends coverage the radio communication to a plurality of portable subscriber units (PSU), wherein a master VRS identifies talk group activity among the plurality of PSUs, assigns slave VRSs to talk groups in order of talk group activity, and assigns each slave VSR a communication channel for handling a single talk group, wherein the master VRS and slave VRSs are communicatively coupled in a vicinity via a radio frequency (RF) communication link.

9. The system of claim 8, wherein a VRS includes:

a mobile radio (MSU) having only one physical channel for providing a talk group with radio communication to the FNE, and a mobile repeater (VR) operatively coupled to the mobile radio and providing the one physical channel of communication to PSUs of the talk group.

10. The system of claim 8, further comprising an assignment list maintained by the master VRS that identifies VRSs and talk group assignments in order of talk group activity.

11. The system of claim 10, further comprising at least one PSU that connects to a slave VRS in accordance with the assignment list to change talk groups.

12. The system of claim 9, wherein a slave VRS dynamically receives talk group activity updates from the master VRSs over the RF communication link, and changes a talk group of the mobile radio (MSU) when a PSU changes talk groups.

13. The system of claim 8, wherein the master VRS assigns talk groups to slave VRSs in order of a frequency of use of a talk group.

14. The system of claim 12, wherein the master VRS updates talk group assignments to each slave VSR based on a frequency of use of a talk group and transmits assignments to each slave VSR over the RF communication link.

15. The system of claim 10, wherein the master VRS assigns talk groups to each slave VSR in order of communicative recognition to the master VRS or on each slave VRS's arrival time in the vicinity.

16. A method for distributing multiple talk group activity, the method comprising:

identifying a first Vehicular Repeater System (VRS) that arrives in a vicinity and that communicates with a plurality of portable subscriber units (PSU);

assigning the first VRS as a master VRS that provides a first channel for handling a first talk group in the plurality of PSU's;

identifying a second VRS that arrives in the vicinity;

identifying at least one PSU in the plurality of PSU's that changes to a second talk group; and assigning the second VRS as a slave VRS that provides a second channel for handling a second talk group for the at least one PSU.

17. The method of claim 16, further comprising:

identifying at least one more VRS that arrives in the vicinity;

identifying at least one more PSU in the plurality of PSU's that changes to at least one more talk group; and assigning the at least one more VRS as a slave VRS that provides at least one more channel for handling the at least one more talk group.

18. The method of claim 16, further comprising:

receiving talk group activity updates from slave VRSs over a RF communication link between multiple VRSs in the vicinity;

determining a frequency of talk group use based on the talk group activity updates; and assigning channels and corresponding talk groups to slave VRSs in order of the frequency of talk group use, wherein each slave VRS provides only one single physical channel at a time for handling a talk group.

19. The method of claim 18, further comprising:

updating a list that assigns slave VRSs and corresponding talk channels in order of talk group activity;

forwarding the list to the slave VRSs and the plurality of PSUs, wherein the plurality of PSUs uses talk group assignments in the list to communicate with an assigned VRS.

20. The method of claim 19, further comprising:

determining whether a VRS has left the scene;

determining whether a VRS has arrived on the scene; and updating the list based on VRSs in the vicinity.

* * * * *

UNITED STATES PATENT AND TRADEMARK OFFICE
CERTIFICATE OF CORRECTION

| | |
|---|---|
| PATENT NO. | : 7,711,319 B2 |
| APPLICATION NO. | : 11/679894 |
| DATED | : May 4, 2010 |
| INVENTOR(S) | : Namm et al. |

It is certified that error appears in the above-identified patent and that said Letters Patent is hereby corrected as shown below:

IN THE SPECIFICATION

In Column 2, Line 40, delete "group" and insert -- group. --, therefor.

In Column 3, Line 8, after "invention;" delete "and".

In Column 3, Line 11, delete "Invention." and insert -- invention; --, therefor.

In Column 6, Line 9, delete "176)" and insert -- 176). --, therefor.

In Column 6, Line 22, delete "group" and insert -- group. --, therefor.

In Column 6, Line 35, delete "list" and insert -- list. --, therefor.

In Column 6, Line 43, delete "FIG. 3" and insert -- FIG. 3. --, therefor.

In Column 6, Line 58, delete "released" and insert -- released. --, therefor.

In Column 7, Line 8, delete "channels" and insert -- channels. --, therefor.

In Column 8, Line 43, delete "101" and insert -- 101. --, therefor.

In Column 8, Line 54, delete "VSR." and insert -- VRS. --, therefor.

In Column 9, Line 2, delete "assignment" and insert -- assignment. --, therefor.

In Column 9, Line 20, delete "activity" and insert -- activity. --, therefor.

In Column 10, Line 19, delete "group" and insert -- group. --, therefor.

IN THE CLAIMS

In Column 11, Line 41, in Claim 8, delete "VSR" and insert -- VRS --, therefor.

Signed and Sealed this
Twenty-fifth Day of October, 2011

David J. Kappos
*Director of the United States Patent and Trademark Office*

CERTIFICATE OF CORRECTION (continued)
U.S. Pat. No. 7,711,319 B2

In Column 12, Line 8, in Claim 14, delete "VSR" and insert -- VRS --, therefor.

In Column 12, Line 10, In Claim 14, delete "VSR" and insert -- VRS --, therefor.

In Column 12, Line 12, In Claim 15, delete "VSR" and insert -- VRS --, therefor.